US008533168B2

(12) United States Patent
Kuehr-McLaren et al.

(10) Patent No.: US 8,533,168 B2
(45) Date of Patent: *Sep. 10, 2013

(54) AUTOMATIC POLICY GENERATION BASED ON ROLE ENTITLEMENTS AND IDENTITY ATTRIBUTES

(75) Inventors: David G. Kuehr-McLaren, Apex, NC (US); Pratik Gupta, Cary, NC (US); Govindaraj Sampathkumar, Durham, NC (US); Vincent C. Williams, Aliso Viejo, CA (US); Sharon L. Cutcher, Austin, TX (US); Sumit Taank, Austin, TX (US); Brian A. Stube, Cambridge, MA (US); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

This patent is subject to a terminal disclaimer.

(21) Appl. No.: 11/780,956

(22) Filed: Jul. 20, 2007

(65) Prior Publication Data

US 2008/0016104 A1 Jan. 17, 2008

Related U.S. Application Data

(63) Continuation of application No. 10/741,708, filed on Dec. 19, 2003, now Pat. No. 7,284,000.

(51) Int. Cl.
*G06F 17/00* (2006.01)
*G06F 17/30* (2006.01)
*G06Q 10/00* (2012.01)

(52) U.S. Cl.
CPC ............... *G06F 17/00* (2013.01); *G06F 17/30* (2013.01); *G06Q 10/00* (2013.01)
USPC .......... 707/694; 707/781; 707/783; 705/7.42; 726/1; 726/2

(58) Field of Classification Search
USPC ..................... 706/45–50; 709/203, 218–222; 707/1–2, 9–10, 100, 102, 200, 201, 205, 707/602–603, 736, 781, 783, 785, 694–695, 707/758, 786; 726/1–7; 705/7.16–7.17, 705/7.42
See application file for complete search history.

(56) References Cited

U.S. PATENT DOCUMENTS

| 5,911,143 A | * | 6/1999 | Deinhart et al. ........... 707/103 R |
| 6,023,765 A | * | 2/2000 | Kuhn ................................. 726/4 |

(Continued)

FOREIGN PATENT DOCUMENTS

WO    WO 02/39232    *    5/2002

OTHER PUBLICATIONS

Sejong Oh et al. "A model for role administration using organization structure", Proceedings of the seventh ACM symposium on Access control models and technologies, 2002, pp. 155-162.*

(Continued)

*Primary Examiner* — Srirama Channavajjala
(74) *Attorney, Agent, or Firm* — Coats & Bennett, PLLC

(57) ABSTRACT

Policies defining the entitlements to be assigned to a new identity joining a role are automatically generated. An automatic policy assigns a new identity the entitlements commonly owned by a predetermined number of identities in the role, which may be all of the role identities. A conditional policy recommends that a new identity be assigned the non-commonly-owned entitlements associated with the role identity whose non-entitlement attributes most closely match the non-entitlement attributes of the new identity. This may be automatically determined by iterating through a vector that maps the non-commonly-owned entitlements with the non-entitlement attributes of each role identity, comparing the non-entitlement attributes of the new identity to find the closest match. The non-commonly-owned entitlements of that identity are then recommended to be assigned to the new identity, upon approval.

9 Claims, 2 Drawing Sheets

(56) References Cited

U.S. PATENT DOCUMENTS

| | | | |
|---|---|---|---|
| 6,055,637 A * | 4/2000 | Hudson et al. | 726/20 |
| 6,073,242 A * | 6/2000 | Hardy et al. | 726/1 |
| 6,088,679 A * | 7/2000 | Barkley | 705/8 |
| 6,202,066 B1 * | 3/2001 | Barkley et al. | 707/9 |
| 6,453,353 B1 * | 9/2002 | Win et al. | 709/229 |
| 7,167,983 B1 * | 1/2007 | Tiller et al. | 713/166 |
| 7,363,650 B2 * | 4/2008 | Moriconi et al. | 726/1 |
| 2002/0026592 A1 * | 2/2002 | Gavrila et al. | 713/201 |
| 2002/0156879 A1 * | 10/2002 | Delany et al. | 709/223 |
| 2002/0188869 A1 * | 12/2002 | Patrick | 713/201 |
| 2003/0200436 A1 * | 10/2003 | Eun et al. | 713/172 |
| 2003/0217127 A1 * | 11/2003 | Sinn | 709/223 |
| 2007/0283422 A1 * | 12/2007 | Iyoda et al. | 726/4 |

OTHER PUBLICATIONS

RBAC in the Solaris™ Operating Environmen, White Paper, Copyright 2000 Sun Microsystems,, 39 pages.*

Cahyo Crysdian, et al. "User Access Control and Security Model", Jurnal Teknologi Maklumat, Jilid 12, Bil. 2 ( Dec. 2000 ).*

* cited by examiner

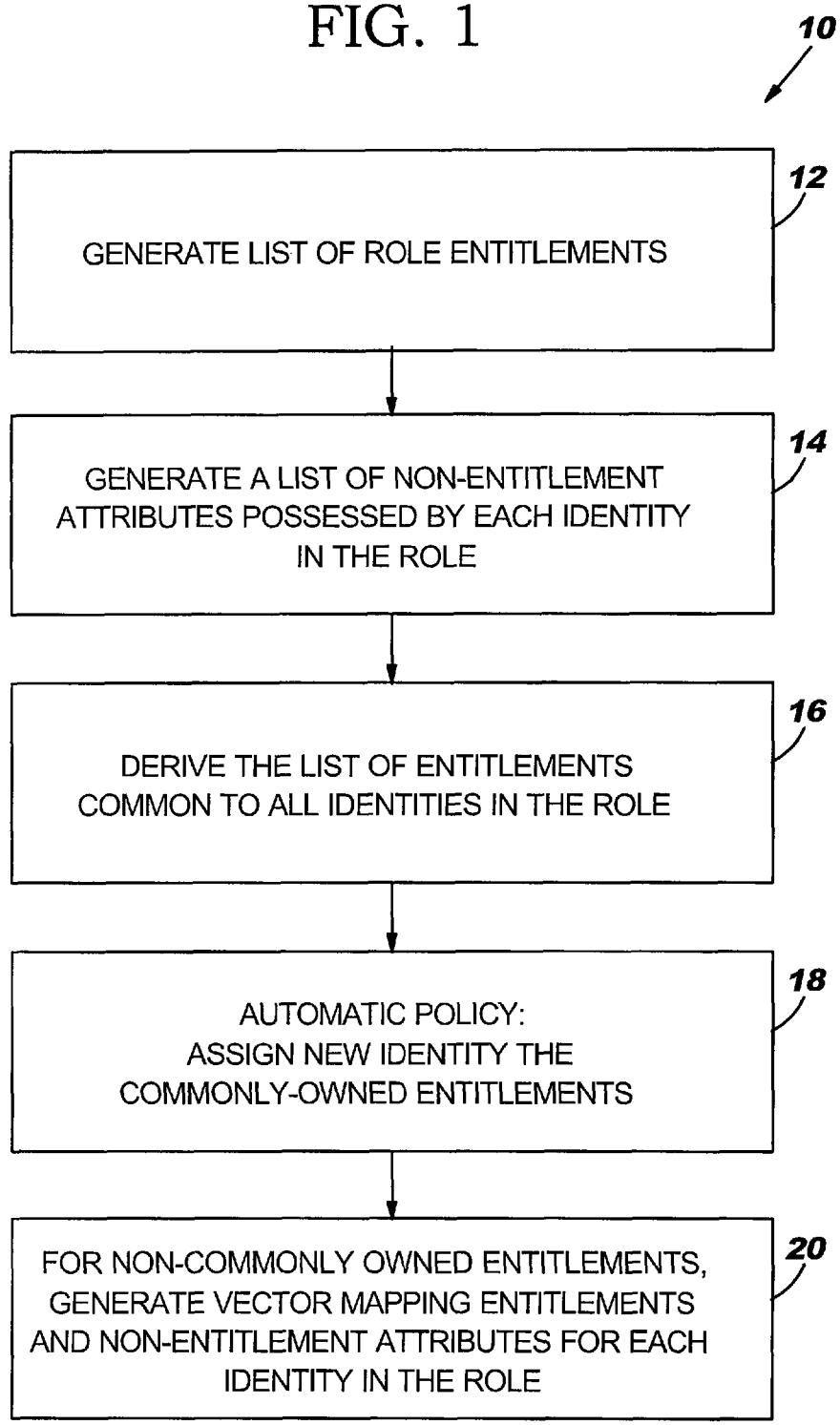

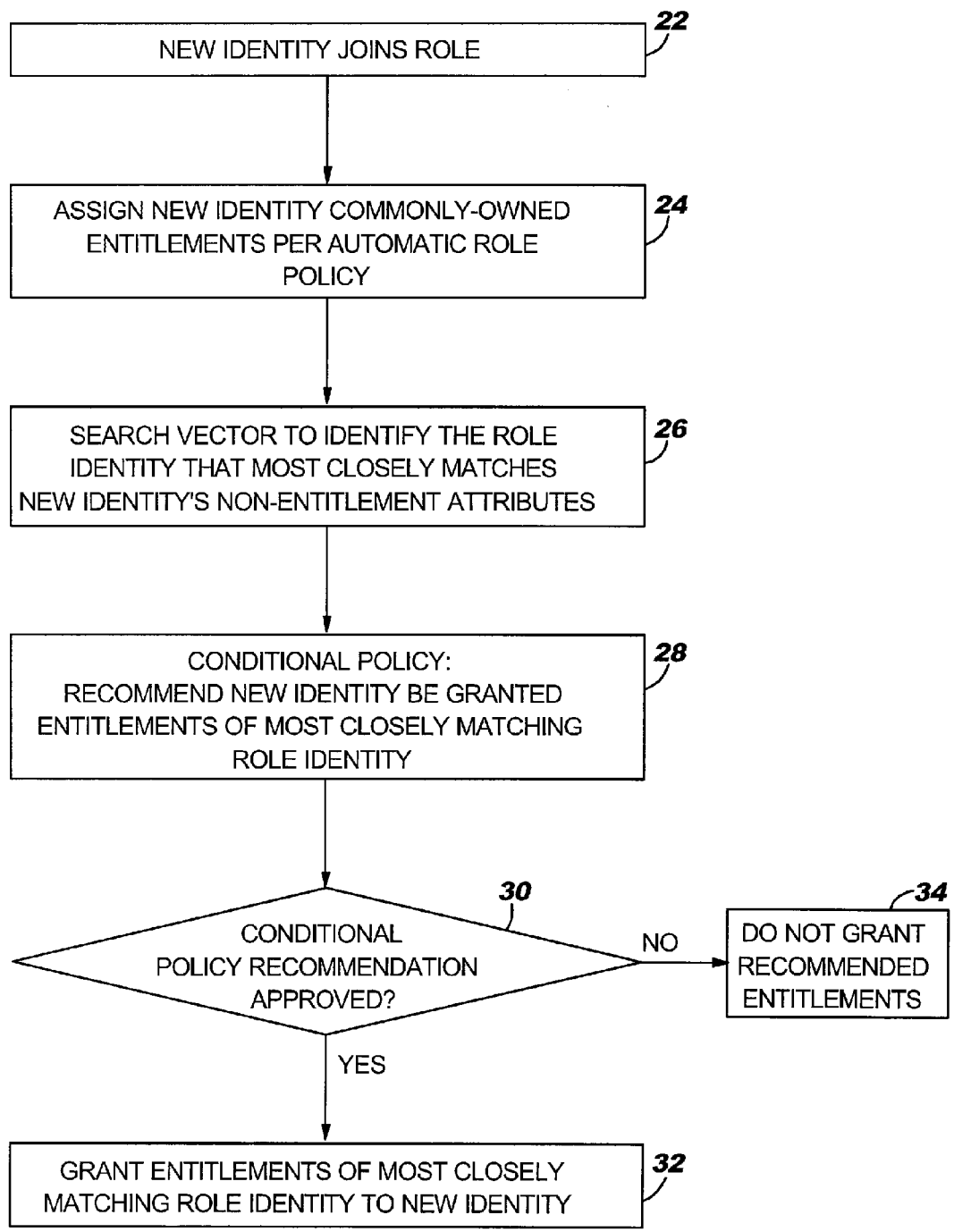

US 8,533,168 B2

AUTOMATIC POLICY GENERATION BASED ON ROLE ENTITLEMENTS AND IDENTITY ATTRIBUTES

This application is a continuation of U.S. Pat. No. 7,284,000, having the same title, filed Dec. 19, 2003.

BACKGROUND

The present invention relates generally to the field of software and in particular to a method of automatically generating policy recommendations for roles based on the entitlements and non-entitlement attributes of identities.

Role based control systems comprise an emerging and promising class of control systems that simplify and streamline the control task by elevating system control rules and decisions from the individual user or process level to a group level. In particular, the grouping of identities in a role based control system reflects the roles the corresponding individuals have as part of an organization that owns, controls, and/or manages the system. Control rules and decisions may then be assigned and managed at the role level rather than the individual level, greatly simplifying management and control of the systems.

A common application for role based control systems, and an application used to explain the present invention, is Role Based Access Control (RBAC). With respect to RBAC, access is defined as the ability to utilize a system, typically an Information Technology (IT) resource, such as a computer system. Examples of ways one may utilize a computer include executing programs; using communications resources; viewing, adding, changing, or deleting data; and the like. Access control is defined as the means by which the ability to utilize the system is explicitly enabled or restricted in some way. Access control typically comprises both physical and system-based controls. Computer-based access controls can prescribe not only which individuals or processes may have access to a specific system resource, but also the type of access that is permitted. These controls may be implemented in the computer system or in external devices.

With RBAC, access decisions are based on the roles that individual users have as part of an organization. Users take on assigned roles, such as for example, engineer, manager, and human resources (HR) personnel. Access rights are grouped by role name, and the use of resources is restricted to individuals authorized to assume the associated role. For example, an HR employee may require full access to personnel records from which engineers should be restricted to preserve privacy, and engineers may require full access to technical design or product data from which HR employees should be restricted to preserve secrecy, while engineering managers require limited access to both types of data. Rather than set up (and maintain) each individual employee's access controls to the personnel and technical data, the organization's access control policies may be more easily managed under RBAC by defining three roles: HR, engineer, and manager. All individuals in the organization who perform the associated role are grouped together, and IT access policies are assigned and maintained on a per-role basis.

The use of role policies to implement access control can be an effective means for developing and enforcing enterprise-specific security policies, and for streamlining the security management process. User membership into roles can be revoked easily and new memberships established as job assignments dictate. New roles and their concomitant policies can be established when new operations are instituted, and old roles can be deleted as organizational functions change and evolve. This simplifies the administration and management of privileges; roles can be updated without updating the privileges for every user on an individual basis.

The current process of defining roles and assigning policies to the roles, often referred to as role engineering, is based on an analysis of how an organization operates, and attempts to map that organizational structure to the organization's IT infrastructure. This "top-down" process requires a substantial amount of time and resources, both for the analysis and implementation. The prospect of this daunting task is itself a significant disincentive for organizations using traditional access control methods to adopt RBAC.

U.S. Pat. No. 7,284,000 discloses an automated "bottom-up" role discovery process that exhibits numerous advantages over the traditional top-down role engineering methods. Broadly speaking, existing roles in the organization are discovered in this process by an analysis of entitlement information pertaining to the organization's IT infrastructure. That is, access roles are discovered by an analysis of the existing IT system security structure. For example, user entitlement data—the systems, programs, resources, and data that a user has permission to access or modify—as well as other user attributes such as name, hire date, work location, and the like, may be extracted for each user or identity. Identities with the same or similar entitlements may then be intelligently clustered into groups that reflect their actual, existing roles within the organization. The users' common individual entitlements may then be more easily managed by assigning the entitlements to the role. The bottom-up method of role discovery avoids the significant investment in time and effort required to define roles in a top-down process, and also may be more accurate in that it reflects the actual, existing roles of users in the organization, as opposed to an individual's or committee's view of what such roles should look like. Another significant advantage to the bottom-up role discovery process is that it may be automated, taking advantage of powerful data mining tools and methodologies.

However, even when roles are automatically formed by the clustering of identities into roles based on entitlements, the formulation of an appropriate policy for the role requires human effort in analyzing the role with respect to the entitlements each identity has in the role, and the various attributes of the identities. A policy specifies which entitlements should be automatically granted to a new identity added to the role and which entitlement(s) should be withheld pending some qualification or approval. This policy formulation requires human effort in analyzing the role with respect to the entitlements that each identity has in the role, and the various attributes of the users, to determine which entitlements should be automatically granted by means of the policy to any new identity who becomes part of the role.

SUMMARY

The present invention relates to a method of automatically generating a policy for a role. The role comprises a plurality of identities having attributes that include entitlements and non-entitlement attributes. The method includes automatically obtaining a list of attributes possessed by a predetermined number (such as all) of the identities in the role, and automatically extracting from the list of attributes a first list of entitlements common to all of the predetermined number of the identities in the role. A policy is automatically formed for the role that the first list of entitlements will be given to an identity subsequently added to the role.

An additional method of automatically generating a role includes automatically extracting from the list of attributes a second list of entitlements not common to all identities in the role. A vector is automatically created for the role considering each identity associated with an entitlement in the second list. The vector maps the set of non-entitlement attributes possessed by the identity to the non-commonly-owned entitlements possessed by the identity. When a new identity having attributes is added to the role, the method automatically iterates through the vector to determine the identity whose non-entitlement attributes most closely match the non-entitlement attributes of the new identity. A policy is then automatically formed for the role, recommending that the new identity be given the entitlements of the most closely matching identity. Upon obtaining approval of the recommendation, these entitlements are given to the new identity.

BRIEF DESCRIPTION OF DRAWINGS

FIG. 1 is a flow diagram of an automatic policy generation method according to one embodiment of the present invention.

FIG. 2 is a flow diagram depicting the application of policies to a role according to one embodiment of the present invention.

DETAILED DESCRIPTION OF THE INVENTION

A policy for a role is a rule that gives entitlements to identities of the role automatically based on the attributes that they possess. As used herein, a role is a collection of identities, grouped together based on the attributes possessed by or associated with the identities. Identities possess attributes that define certain characteristics about the identity. For example, an IT system user's identity may have associated therewith attributes that define or describe the user, such as name, employee number, hire date, office location, job title, and the like. Each attribute may have one or more values, such as an alphanumeric string, number, date, or other value as appropriate to the attribute.

One subset of attributes an identity may possess are entitlements. As used herein, entitlements are the access permissions, privileges, and restrictions assigned to the individual with respect to the controlled entity, such as for example IT resources. Entitlements are one type of attribute that have particular utility in defining roles and extracting policies for the roles. Other identity attributes, that do not relate to access control, are non-entitlement attributes. As used herein, the term "attributes" refers to all attributes possessed by or associated with an identity, including entitlements. "Non-entitlement attributes" refers to an identity's attributes other than entitlements.

A role is generated (either manually through role engineering or automatically by clustering identities based on attributes) and assumes entitlements that become role entitlements. Role entitlements are those entitlements deemed appropriate for the role—indeed, the set of role entitlements define the role in an RBAC system. The relevance of a role is the correlation between the role identities' entitlements and the role entitlements. In other words, in roles with a high relevance factor, the role entitlements are possessed by most of the identities comprising the role (if the entitlements are possessed by all identities, the role is said to be cohesive). Conversely, in a role with a low relevance factor, not all identities will possess the role entitlements. In either case, identities in the role may possess entitlements that are not shared by many (or any) other role identities, and are not role entitlements. The varying relevance of roles is one factor that makes policy generation for roles problematic.

According to the present invention, role policies are automatically generated based on the attributes (i.e, the entitlements and non-entitlement attributes) possessed by the identities comprising the role. As used herein, "automatically" means without direct human effort, such as via software. These policies may be automatically applied to the role, or may be presented for review, and applied to the role following approval. In some embodiments, a multi-tiered policy may include some elements that are automatically applied to the role as they are generated, and other elements that are presented for approval prior to being applied.

When a new identity is added to a role (such as when a new employee is hired, or an existing employee changes job class, level or function), the role policy will determine the entitlements to be assigned to the identity. Some entitlements may be assigned to the identity automatically as a result of the role policy, such as for example all new employees being given access to email facilities. This type of policy is referred to herein as an automatic policy. Other entitlements, such as access to sensitive data, may only be assigned to a new identity based on a comparison between the identity's non-entitlement attributes and the entitlements and non-entitlement attributes of other identities in the role. For example, an identity may be assigned off-hours access to a facility if his job code, work location, and scheduled hours match those of other identities in the role who have off-hours access, even though off-hours facility access may not be a role entitlement that is automatically assigned to every identity joining the role. Furthermore, the off-hours access may not be automatically granted even upon detection of a close match to other off-hours role members—the role policy may make granting off-hours access to the new identity a recommendation that must be approved by a manager or facilities security officer before the entitlement is actually assigned to the new identity. This type of policy is referred to herein as a conditional policy.

A method of automatic role policy generation according to one embodiment of the present invention is depicted in flowchart form in FIG. 1, indicated generally by the number 10. For each role for which a policy is to be automatically generated, a list of role entitlements is generated at step 12. A list of non-entitlement attributes possessed by each identity in the role is generated at step 14. At step 16, a list of entitlements common to all identities in the role is derived, and the automatic assignment of these entitlements to any new identity joining the role comprises an automatic role policy (step 18). For the remaining set of entitlements (e.g, entitlements not common to all role identities), a vector is generated that represents a map or association of the set of non-entitlement attributes to the corresponding set of entitlements possessed by each identity in the role, at step 20. One way of generating this vector is via the data mining technique of Association Rule Mining, which, as known in the art, is used to find association rules (or correlations) between items in a set. In this case, the set of non-entitlement attributes and the set of entitlements for each identity would be inputs to the Association Rule Mining engine to generate the mapping vector. Other methods may also be used for this task, as known in the art.

Implementation of an automatic policy and generation of a conditional policy are depicted by the flowchart of FIG. 2. When a new identity joins the role at step 22, it is assigned the set of entitlements according to the automatic policy of step 18 (FIG. 1), at step 24. The vector created in step 20 is searched to identify the identity whose non-entitlement attributes most closely match the non-entitlement attributes of the new identity, at step 26. The entitlements of the most closely matching identity are recommended for the new identity as a conditional policy at step 28. Finally, if approval of the conditional policy recommendation is obtained at step 30, the new identity is granted the recommended entitlements at step 32. If the conditional policy recommendation is not approved, the recommended entitlements are not granted to the new identity at step 34.

According to another embodiment of the present invention, rather than obtaining a list of non-entitlement attributes (step 14) and commonly-possessed entitlements (step 16) for all identities in the role, these lists may be generated by consulting only a predetermined number of the identities in the role. Thereafter, the list of entitlements so generated may be assigned to a new identity as an automatic policy, or alternatively they may be recommended as a conditional policy, and assigned to a new identity upon approval.

In this manner, the management of entitlements of identities is dramatically simplified as compared to prior art processes and procedures. By defining roles by the entitlements of identities and automatically generating automatic and/or conditional policies that assign entitlements to identities newly added to the roles, the management of entitlements—particularly those of newly hired or intra-organizationally mobile individuals—is greatly simplified. Additionally, the judicious use of conditional policies for roles helps ensure that access to sensitive information and/or facilities is not inadvertently granted.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of automatically generating a policy for a role, said role comprising a plurality of identities of individuals, each identity having attributes that include entitlements and non-entitlement attributes, comprising:

automatically obtaining a list of attributes possessed by a predetermined number of the identities in said role;

automatically extracting from said list of attributes a list of entitlements common to all of said predetermined number of the identities in said role; and automatically forming a policy for said role that said list of entitlements will be given to an identity subsequently added to said role.

2. The method of claim 1 wherein said predetermined number of the identities in said role is the total number of identities in said role.

3. A method of assigning entitlements to a new identity upon joining a role, comprising:

providing a role comprising a plurality of identities of individuals, the identities having attributes that include entitlements and non-entitlement attributes;

automatically generating a policy for said role based on said entitlements; and when a new identity having attributes is subsequently added to said role, applying said policy to said new identity.

4. The method of claim 3 wherein said policy comprises an automatic policy.

5. The method of claim 4 wherein said automatic policy comprises assigning to said new identity a set of entitlements possessed by a predetermined number of the identities in said role.

6. The method of claim 4 wherein said predetermined number of the identities in said role is the total number of identities in said role.

7. The method of claim 3 wherein said policy comprises a conditional policy.

8. The method of claim 7 wherein said conditional policy comprises recommending that said new identity be assigned the entitlements possessed by the role identity most closely matching said new identity.

9. The method of claim 8 wherein the role identity most closely matching said new identity is the role identity whose non-entitlement attributes most closely match the non-entitlement attributes of said new identity.

* * * * *